US006875112B2

United States Patent
(12) United States Patent
te Uhle et al.

(10) Patent No.: US 6,875,112 B2
(45) Date of Patent: Apr. 5, 2005

(54) ELASTIC COUPLING AND ELASTOMERIC ELEMENT THEREFOR

(75) Inventors: Michael te Uhle, Rhede (DE); Peter Gödde, Dorsten (DE); Josef Fellinger, Neukirchen (AT)

(73) Assignee: A. Friedr. Flender GmbH (DE)

( * ) Notice: Subject to any disclaimer, the term of this patent is extended or adjusted under 35 U.S.C. 154(b) by 0 days.

(21) Appl. No.: 10/453,996

(22) Filed: Jun. 4, 2003

(65) Prior Publication Data

US 2003/0228919 A1 Dec. 11, 2003

(30) Foreign Application Priority Data

Jun. 11, 2002 (DE) ........................................ 102 25 948

(51) Int. Cl.[7] .................................................. F16D 3/70

(52) U.S. Cl. ........................................... 464/83; 464/85

(58) Field of Search ............................. 464/62, 73, 76, 464/81, 83, 85, 71, 72

(56) References Cited

U.S. PATENT DOCUMENTS

| | | | | |
|---|---|---|---|---|
| 1,362,048 A | * | 12/1920 | Shepard | 464/62 |
| 1,633,580 A | * | 6/1927 | Froesch | 464/83 X |
| 2,074,939 A | | 3/1937 | Ricefield | |
| 2,566,985 A | * | 9/1951 | Gee | 464/83 |
| 3,195,324 A | | 7/1965 | Sellwood et al. | |
| 5,545,089 A | * | 8/1996 | Kirschey | 464/83 |
| 5,690,554 A | * | 11/1997 | Imanaka et al. | 464/85 X |

FOREIGN PATENT DOCUMENTS

| | | | | |
|---|---|---|---|---|
| DE | 492 985 | | 3/1930 | |
| DE | 636 924 | | 10/1936 | |
| DE | 707 502 | | 6/1941 | |
| DE | 733583 | * | 3/1943 | 464/83 |
| DE | 877513 | * | 5/1950 | 464/83 |
| DE | 889 095 | | 9/1953 | |
| DE | 954302 | * | 12/1956 | 464/83 |
| DE | 1095595 | | 12/1960 | |
| DE | 2813880 | | 10/1979 | |
| DE | 2903636 | | 8/1980 | |
| DE | 39 10 502 | | 10/1990 | |
| IT | 587880 | * | 1/1959 | 464/85 |

* cited by examiner

*Primary Examiner*—Greg Binda
(74) *Attorney, Agent, or Firm*—Robert W. Becker & Associates; Robert W. Becker

(57) ABSTRACT

An elastic coupling having two coupling sections is provided. A first coupling section has a plurality of spaced-apart pockets disposed along an arc. Elastomeric elements are positively held in the pockets, and the second coupling section has projections that extend into the first coupling section respectively between two adjacent elastomeric elements. The elastomeric elements comprise two regions having different properties. The first region, which extends radially and is held in the pockets of the first coupling section via its ends, is more inherently stable than is the second region for the transmission of a peripheral force. The second region, which respectively faces one of the projections of the second coupling section, is more yielding than is the first region such that deformations can be introduced into the second region with the effect of a slight restoring force.

3 Claims, 2 Drawing Sheets

ELASTIC COUPLING AND ELASTOMERIC ELEMENT THEREFOR

BACKGROUND OF THE INVENTION

The present invention relates to an elastic, insertable coupling, as well as to an elastomeric element for an elastic coupling.

Insertable, elastic couplings are widely used in industry, and are utilized in various applications, such as, for example, pump drives. These couplings transfer the torque of the apparatus or mechanisms that are to be coupled accompanied by the simultaneously acting staggered shaft arrangement. In some applications, elastic couplings having no penetration protection ("penetration type of construction") are preferably utilized and are characterized in that when excessive load or wear is encountered, or upon destruction of the elastomeric elements of the coupling, a non-contact, free rotation of the coupling parts relative to one another is ensured.

Elastic couplings having elastomeric elements, for example pursuant to DE 39 10 502 C2, transmit the torque by means of a peripheral force that primarily subjects the elastomeric elements to bending and pressure. In order at a prescribed structural size to be able to transfer as great a torque as possible, the elastomeric element must be as hard as possible. On the other hand, the staggered shaft arrangement of the coupled mechanisms leads to a deformation of the elastomeric element. Similarly, the requirement of having a low restoring force, and hence the requirement of having low additional bearing forces of the coupled mechanisms, call for elastomeric elements that are as soft as possible. In addition, the hardness of the elastomeric element essentially determines the torsional spring rigidity of the coupling. Here too there often exists the requirement for a configuration having low torsional stiffness with correspondingly high dampening.

At the present, elastomeric elements for elastic couplings are utilized having largely homogeneous properties, whereby the aforementioned conflicting requirements often cannot be adequately covered. Either the elastomeric element is made relatively hard, with the drawback of an only slightly permissible staggered shaft arrangement, or the torque of a prescribed structural size that can be transmitted must be limited if relatively soft elastomeric elements are used.

It is therefore an object of the present invention to embody the elastomeric element of the aforementioned type of elastic coupling having no penetration protection in such a way that not only the requirement for transmitting a high torque, but also the requirement for having a low restoring force and the compensation of a staggered shaft arrangement, can be fulfilled.

SUMMARY OF THE INVENTION

The elastic coupling of the present invention, without penetration protection, comprises two coupling sections, a first of which has a plurality of spaced-apart pockets that are disposed along an arc, and a second section of which is provided with lugs or projections, wherein elastomeric elements are respectively positively held in the pockets, wherein the projections of the second coupling section respectively extend into the first coupling section between two adjacent elastomeric elements, wherein each elastomeric element comprises a first region and a second region each having different properties, wherein the first region extends radially and has ends that are held in the pockets, wherein the first region is more inherently stable than is the second region to transmit a peripheral force, and wherein each second region faces a projection of the second coupling section and is more yielding than is the first region such that deformations can be introduced into the second region with the effect of a slight restoring force.

The elastomeric element of the inventive elastic coupling, which is without penetration protection, fulfills the established, conflicting requirements in that each of the two regions from which the elastomeric element is formed is respectively designed for one of the requirements. In this connection, the first region of the elastomeric element, which is primarily subjected to bending due to the peripheral force, is relatively hard, and the second region, which is primarily subjected to pressure, and which can absorb a relatively large amount of deformation, is relatively soft. The outer dimensions of the previously used elastomeric elements can stay the same, so that the inventive elastomeric element can be inserted without changing the connection components of the elastic coupling.

Further specific features of the present invention will be described in detail subsequently.

BRIEF DESCRIPTION OF THE DRAWING

This object, and other objects and advantages of the present invention, will appear more clearly from the following specification in conjunction with the accompanying schematic drawing, in which.

DESCRIPTION OF PREFERRED EMBODIMENTS

Figure 1:
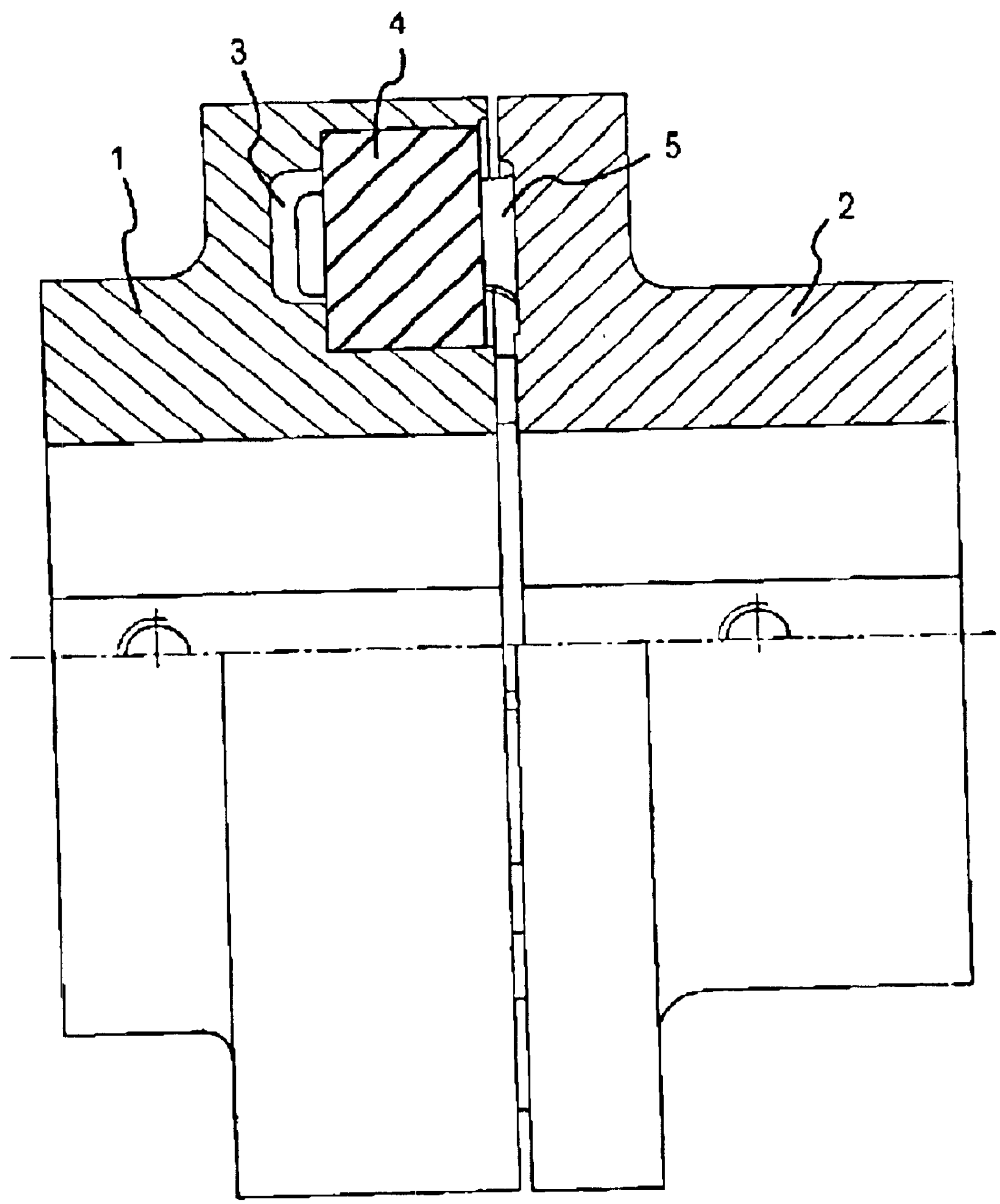
FIG. 1 is a longitudinal cross-sectional view through one exemplary embodiment of an inventive elastic coupling taken along the line I—I in FIG. 2.

Referring now to the drawings in detail, the illustrated insertable, elastic coupling, which is without penetration protection, comprises a first coupling section 1 and a second coupling section 2, which are placed upon the shafts of the apparatus or mechanisms that are to be connected. In the first coupling section 1, a plurality of pockets 3 are disposed along an arc and are spaced from one another. Inserted into each pocket 3 is an elastomeric element 4, whereby the radially inwardly and radially outwardly directed ends 8 of the elastomeric element 4 are held in the first coupling section 1. The second coupling section 2 is provided with lugs or projections 5 that respectively extend into the first coupling section 1 into the free spaces between the elastomeric elements 4. By means of the projections 5, the torque transfer is achieved in the form of a peripheral force that acts on the radially inwardly and radially outwardly disposed ends 8 of the elastomeric elements 4. In the event that the elastomeric element 4 is destroyed, the two coupling sections 1,2 can rotate freely without direct contact.

Figure 2:
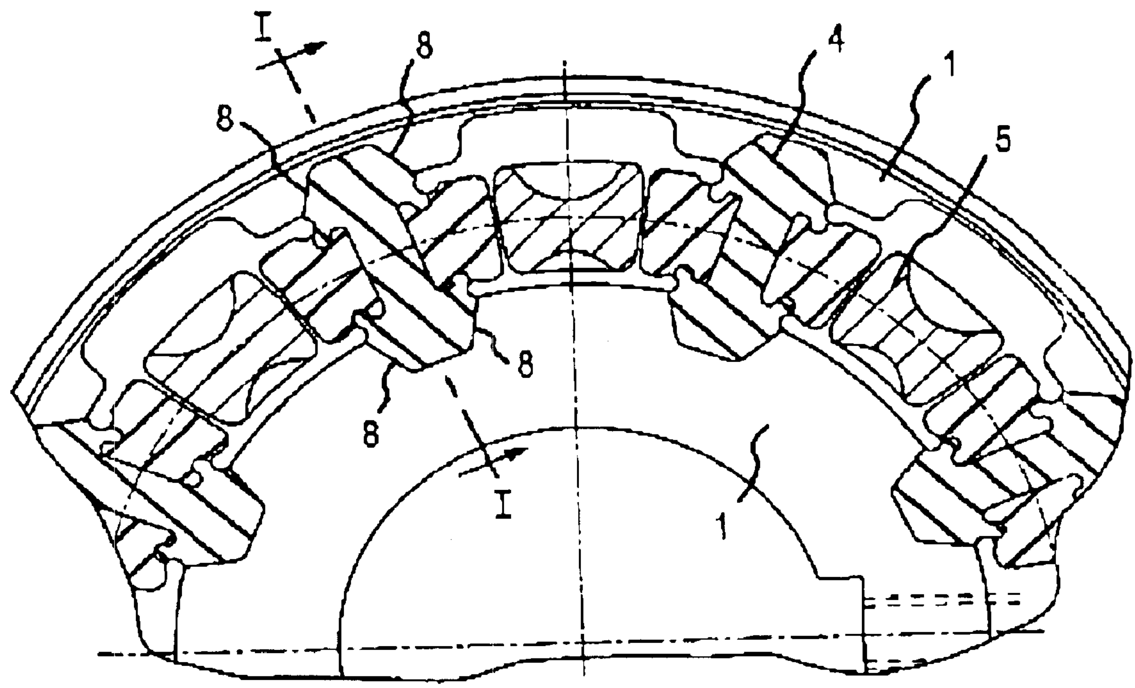
FIG. 2 is a partial cross-sectional view through the embodiment of FIG. 1.
Figure 3:
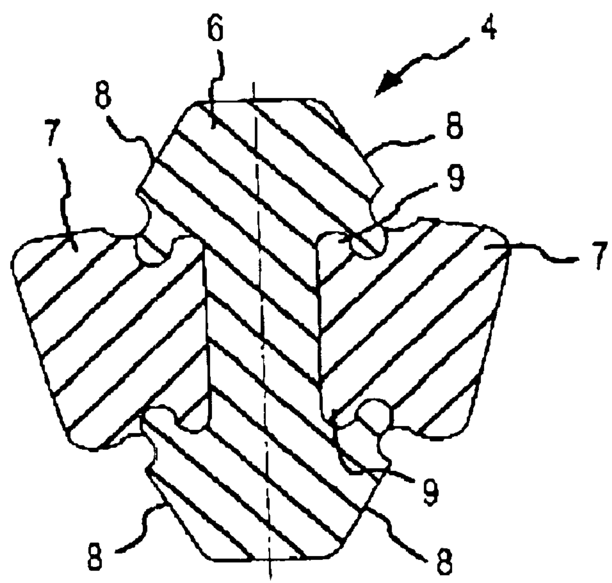
FIG. 3 is an enlarged longitudinal cross-sectional view through an elastomeric element of the elastic coupling of FIGS. 1 and 2.

The elastomeric element 4 is illustrated enlarged in FIG. 2, and is provided with a first region 6 and a second region 7. The first region 6 extends essentially in a radial direction of the coupling and has conically tapered ends 8 via which the elastomeric element 4 is held in the first coupling section 1. The second region 7 has the form of two protusions which, with the coupling inserted, at the level of the projections 5 are laterally formed on the first region 6 of the elastomeric element 4. On the inwardly disposed side, the protrusions are provided with an undercut profile 9 via which they engage into the first region 6 in the manner of a toothing. The two regions 6,7 of the elastomeric element 4 are fixedly interconnected by vulcanization. In addition to a material-positive connection due to the vulcanization, a positive or form-locking connection exists by the toothing via the undercut profile 9.

The two regions 6, 7 of the elastomeric element 4 are designed for different properties. The first region 6 is inherently stable and hard relative to the second region 7, and is loaded in a combined pressure and bending stress. The second region 7 that is comprised of the two protrusions is soft and resilient in comparison with the first region 6. This second region 7 is primarily subjected to pressure and, due to the specific configuration of the deformation transmitted from the outside, can yield without relatively large restoring forces. Furthermore, it is advantageous that a relative movement between a projection 5 and the protrusions of the second region 7 of the elastomeric element 4 be avoided at relatively soft surfaces due to the increased frictional value in comparison to a hard rubber element. This eliminates an abrasive wear at the elastomeric element 4.

The specification incorporates by reference the disclosure of German priority document 102 25 948.8 filed 11 Jun. 2002.

The present invention is, of course, in no way restricted to the specific disclosure of the specification and drawing, but also encompasses any modifications within the scope of the appended claims.

What is claimed is:

1. An elastic coupling comprising:

a first coupling section having a plurality of spaced-part pockets that are disposed along an arc;

a second coupling section having projections; and elastomeric elements that are respectively positively held in said pockets, wherein said projections of said second coupling section respectively extend into said first coupling section between two adjacent ones of said elastomeric elements, wherein each elastomeric element comprises a first region and a second region each having different properties, wherein said first region extends radially and has ends that are held in said pockets, wherein said first region is more inherently stable than is said second region to transmit a peripheral force, wherein said second region faces one of the projections of said second coupling section and is more yielding than is said first region such that deformations can be introduced into said second region, and wherein said second more yielding region of said elastomeric element comprises two protrusions that at a level of said projection of said second coupling section are laterally formed on said first, more inherently stable region.

2. An elastic coupling according to claim 1, wherein said first region and said second region of said elastomeric element are interconnected in a material-positive manner by means of vulcanization.

3. An elastic coupling according to claim 2, wherein each of said protrusions of said second region is provided on an inwardly disposed side with in undercut profile, and wherein said second region, in addition to said material-positive connection, positively engages said first region via said undercut profiles in a manner of a toothing.

* * * * *